United States Patent [19] [11] 4,097,635
Sanz Hernández et al. [45] Jun. 27, 1978

[54] DECORATIVE PANEL
[75] Inventors: José Antonio Sanz Hernández; Cassiano Mesquita Netto, both of Salto, Brazil
[73] Assignee: Eucatex, S.A., Sao Paulo, Brazil
[21] Appl. No.: 755,545
[22] Filed: Dec. 27, 1976
[51] Int. Cl.² .................... B32B 3/02; B32B 3/10; B32B 9/04
[52] U.S. Cl. .................... 428/172; 106/20; 428/203; 428/204; 428/207; 428/447
[58] Field of Search .................. 106/20; 428/143, 149, 428/151, 195, 207, 245, 331, 327, 405, 447, 203, 152, 204, 172; 427/262

[56] References Cited
U.S. PATENT DOCUMENTS 3,477,869 11/1969 Butler et al. .................... 428/447
3,811,915 5/1974 Burrell et al. .................... 428/143
3,857,720 12/1974 Fellows .................... 428/447 X
4,020,761 5/1977 Ogiwara .................... 428/447 X FOREIGN PATENT DOCUMENTS
981,124 1/1976 Canada.

Primary Examiner—George F. Lesmes
Assistant Examiner—R. Eugene Varndell, Jr.
Attorney, Agent, or Firm—Cushman, Darby & Cushman

[57] ABSTRACT

A base coated substrate carries a pattern defined by a silicone-containing printing ink. A silicone-containing top coat covers the inked substrate, the top coat being disturbed by the repulsion forces of the ink's silicone at locations adjacent the edges of the patterns thereby producing a three-dimensional effect in an otherwise smooth top coat surface.

4 Claims, 3 Drawing Figures

DECORATIVE PANEL

The present invention relates to a decorative panel particularly suited for such uses as wall and ceiling coverings, furniture, etc. In fabricating such a panel, it is desirable to produce a surface which is non-uniform so as to provide a three-dimensional effect.

Attempts have been made in the past to form a panel having a textured surface by applying to a substrate a silicone-containing ink in a pattern and covering the inked substrate with a top coating. The silicone repels the top coating at the edges of the ink-top coat interface to produce an uneven surface. Such prior efforts are disclosed, for example, in U.S. Pat. No. 3,811,915 which issued on May 21, 1974 in the names of Harry Bunell and Robert C. Millen, Jr., and in Canadian Pat. No. 981,124 which has granted to John C. Barker and Ivan P. McLaughlin on Jan. 6. 1976.

However, an important shortcoming exists in the previously known products. More particularly, using the techniques described in the aforesaid patents, when a given segment of ink covers a substantial area for the purpose of producing, for example, a geometric figure on the finished panel, the application of the top coating results in the figure having a plurality of separate "islands" of top coating within the confines of the area defined by the ink or alternatively a series of "fisheyes" or cells of the top coating within this area. The latter result can be referred to as a "hammered" effect. While such configurations have interesting and attractive appearances, it is impossible to accurately duplicate them in subsequent panels. Thus, when a plurality of panels so fabricated are used to cover a wall, the randomly produced effects in the several panels produce an overall appearance which is generally unacceptable.

The problem just described is recognized in Canadian Pat. No. 981,124 where it is stated that for best results, the inked pattern should define lines of 1/16 to 3/16 thickness rather than surface areas.

Another shortcoming of products of the type disclosed in the aforesaid patents is that as the upper limit of silicone in the printing ink is reached (the upper limits being stated as 3% in U.S. Pat. No. 3,811,915 and 5% in Canadian Pat. No. 981,124), the displacement of the top coat away from the edges of the printing ink increases causing a substantial build-up of top coat material in an irregular manner. This condition detracts from the appearance of the product.

A still further aesthetic problem of prior art products is that when a material such as polyester is used in the top coat (as is disclosed in each of the aforesaid patents), the natural characteristic of the material is to produce an uneven surface.

SUMMARY OF THE INVENTION

The present invention constitutes an improvement over the prior art by providing for a panel construction having a three-dimensional effect on its surface while also allowing large surface areas to be printed and covered with a top coating of uniform thickness. This is accomplished by providing respectively both the pattern-defining ink and the top coating with silicone components, whereby at the peripheries of the inked areas there is a flow of the top coat so as to produce a sharply defined depression-elevation phenomenon which gives the product its three-dimensional effect, while over the printing ink areas and over the unprinted areas not encompassed by depressions and elevations the top coat is rendered smooth. The resultant product is one which can be repeatedly reproduced with great accuracy thereby making the product suitable for mass production.

The invention will be described in further detail with reference to the accompanying drawings wherein.

DETAILED DESCRIPTION OF THE INVENTION

Figure 1:
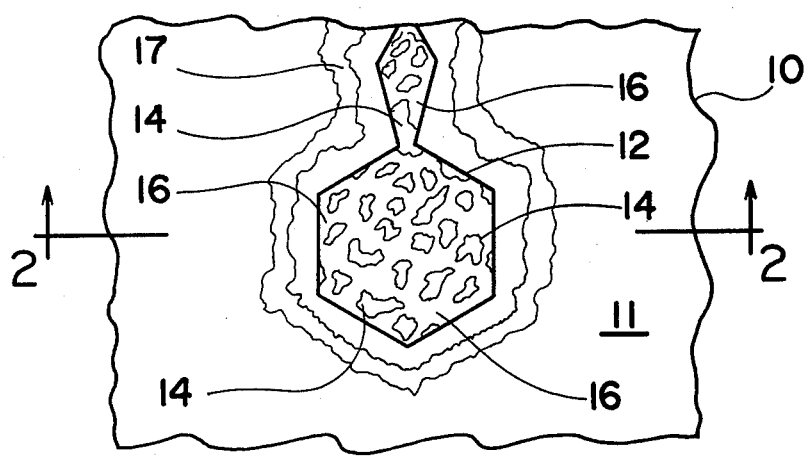
FIG. 1 is a plan view of an illustrative pattern made in accordance with prior art techniques.
Figure 2:
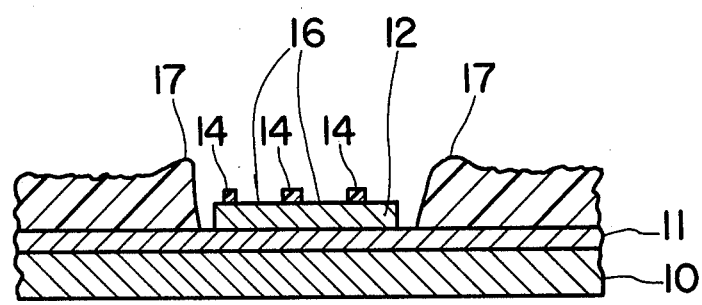
FIG. 2 is a sectional view taken along line 2—2 of FIG. 1.

Referring to FIGS. 1 and 2 of the drawings, the problem which the present invention solves will first be explained.

If a substrate 10 is covered with a base coat 11 and then with a pattern of silicone-containing printing ink 12 in accordance with the teachings of the aforesaid U.S. Pat. No. 3,811,915 and Canadian Pat. No. 981,124, and should areas defined by the printing ink 12 be substantial, the application of a conventional top coat over the exposed surface of the assembley produces a series of "islands" 14 (or sometimes a series of "fisheyes" or cells) of top coat material separated by voids 16 which expose the printing ink. This creates an appearance which is not reproducible with continuous accuracy.

The silicone in ink 12 also repels the top coat adjacent to the printed pattern to cause a buildup of top coat material designated as 17. With the ink's silicone content in the general range of 3 - 5%, the buildup of the top coat is substantial and assures an irregular outline as can be seen in FIG. 1. This contributes to an unacceptable product appearance, particularly when the top coat is pigmented with colors which are not muted. As shown in FIG. 2, the remaining surface of top coat over the unprinted area often is uneven, particularly if a polyester is used as a component of the top coat. Also in accordance with U.S. Pat. No. 3,811,915 and Canadian Pat. No. 981,124 the surface of the top coat over the unprinted areas is higher than over the printed areas.

In accordance with the present invention, the problems just discussed are overcome as now will be described with reference to FIG. 3.

A cleaned substrate 18, typically a material such as hardboard, paper, cardboard, particle board, hardwood, cement asbestos, aluminum, etc., receives a plurality of successive coatings. In the case of certain of these materials (e.g., plywood, hardwood and particle board) the first of these coatings is a filler or sealer (not shown). Such a coating, if employed, is accomplished with conventional materials and techniques so well known in the art that it is unnecessary to list them at this time, particularly since they form no part of the present invention.

A pigmented base coat 20 then is applied to the substrate by conventional techniques such as roller or curtain coating. After drying of the base coat, a silicone-containing printing ink 22 is selectively disposed on the base coat in a pattern established by such typical processes as silk screen, offset, rotogravure, flexography, brush (air or hand), airbrush, etc.

Following a drying step which is employed to drive off solvents (and in the case of a seccative ink, to completely dry the ink), a top coat 24 is used to cover the ink 22 and the portions of base coat 20 left exposed by the ink. The top coat is applied by conventional means such as rollers, spraying equipment, brushes, electrostatics, etc. Thereafter, the product is exposed to a step 5 in which any remaining solvents are driven off, and the product is dried. This step can be performed by open air, hot circulated air, air jets, infra-red heaters, electron beams, ultraviolet, electric or gas heaters, or combinations of these conventional techniques.

As will be explained hereinafter, the top coat 24 also contains a silicone. Accordingly, the effect of the silicones in ink 22 and top coat 24 is to produce depressions 26 at the ink-top coat interface adjacent the edges of the ink and elevations 28 immediately outwardly of the depression 26. The location of these depressions and elevations is controlled by the top coat silicones. No surface disturbance is created over the printed areas, notwithstanding their size, and therefore, a smooth top coat surface is left in these areas, this surface being at a level between those of the peaks of the depressions 26 and the elevations 28. The level of top coat 24 over the printed areas is substantially the same as that of the remaining top coat covering the previously exposed areas of base coat 20. The latter also has a smooth surface due to the silicone in the top coat.

As a result of the control achieved according to the invention, the pattern can be precisely repeated in manufacturing subsequent panels. Thus, uniform panels can be made on a continuous basis.

The results of the invention having been described, details of materials which may be employed in fabricating the improved product now will be set forth.

Base Coat

A number of conventional base coat materials are suitable for use in practicing the present invention. One such formulation which has been employed is as follows with proportions being indicated as percentage by weight.

|  | Range | Preferred Amount |
|---|---|---|
| titanium dioxide | 25 – 33 % | 30 % |
| calcium carbonate | 20 – 25 % | 22 % |
| lecithin | 1.3 – 1.7 % | 1.5 % |
| alkyd resin (non-drying) | 15 – 20 % | 16.1 % |
| aromatic solvent (with high boiling point) | 7 – 10 % | 8 % |
| xylene | 4 – 6 % | 4.4 % |
| melamine resin | 10 – 15 % | 12.5 % |
| butyl alcohol | 2.5 – 5 % | 3.0 % |
| glycol butyl ether, 2-butoxyethanol | 2 – 4 % | 2.5 % |

The alkyd resin just listed is a reaction product of phthalic anhydride and glycerol modified with a short-oil (raw castor oil). The resin has a solids content of 50% in solution with a xylol solvent, KKK a Gardner-Holdt viscosity of N-P, a specific weight of 0.989–0.999 and an acid number of 8–13.

The melamine resin is a reaction product of melamine, formaldehyde and butyl alcohol. The resin has a solids content of 58–62% in solution with xylol-butanol, KKK a Gardner-Holdt viscosity of S—V, a specific weight of 1.02–1.04 and an acid number of 1 (max.).

The high boiling point aromatic solvent is typically a material such as Esso's Solvesso 100 having a specific weight 70/60° F of 0.8729, a flash point of 115° F, an aromatics content of 99.2 (D-1319) and 97.4 (D-875), a boiling range of 320° F (initial point) to 350° F (final state) and a refraction index of 1.49988.

Printing Ink Base

A suitable base for a printing ink employed in carrying out the present invention includes:

|  | Range | Preferred Amount |
|---|---|---|
| isophorone COCH:C(CH$_3$) CH$_2$C(CH$_3$)$_2$CH$_2$ | 10 – 13 % | 11.5 % |
| glycol butyl ether, 2-butoxyethanol | 12 – 15 % | 14.0 % |
| diacetone alcohol | 5 – 8 % | 6.5 % |
| hexylene glycol | 6 – 9 % | 9.8 % |
| vinyl resin | 4 – 6 % | 4.2 % |
| alkyd resin (same as used in base coat) | 19.5 – 20 % | 19.0 % |
| calcium carbonate | 1.8 – 2.5 % | 2.1 % |
| lecithin | 0.8 – 1.3 % | 1.0 % |
| thickener agent | 18 – 24 % | 22.0 % |
| pigment | 10 – 30 % | 11.9 % (for a typical yellow) |

The vinyl resin is a vinyl chloride-vinyl acetate copolymer (91% PVC and 3% PVA, with the remainder being a hydroxyl calculated as vinyl alcohol). The resin has a specific weight of 1.39, a molecular weight of 23,100 and a glass transition temperature of 79° C.

The thickener agent typically has a formulation of:

|  | Range | Preferred Amount |
|---|---|---|
| xylene | 75 – 83 % | 81.6 % |
| Bentone 38 (a commercial product of NL Industries, Inc.) | 9.5 – 11 % | 10.2 % |
| Anti-Terra U (a commercial product of Byk-Mallinckrott) | 8 – 10 % | 8.2 % |

Bentone 38 is an organic derivative of montmorillonite clay having a density (gm/cm$^3$) of 1.70.

Anti-Terra U is an ester acid of high molecular weight over a base of polyaminamide salt. The composition has a specific weight 20/4° C of 0.94, a pH of 6 – 8, an index of refraction of 1.490 and a flash point of approximately 23° C (Abel-Persky).

While the foregoing ink base formulation utilizes as a binder a combination of vinyl and alkyd resins, it also is possible to use just a vinyl or an alkyd resin as the binder. Alternatively, other binders which may be employed are nitrocellulose, chloridated rubber ($C_{10}H_{11}Cl_7$), an oil free polyester resin with nitrocellulose, or combinations of such binder materials. A suitable oil free polyester is the commercial product Polylite JC-643 by Reichhold Chemicals, Inc., a product of the reaction of a synthetic saturated fatty acid having a viscosity (Gardner) of $Z_1 - Z_4$, a solids content of 69 – 71% in solution with a xylol solvent, an acid number of 7 (max.), a hydroxyl number of 140 – 160 and a hydroxyl percentage of 4.24 – 4.84%.

The ink base may employ a single pigment. Alternatively, differently pigmented ink base formulations may be utilized for different areas of the surface being coated so as to create various color effects.

Silicone Additive to Printing Ink Base

In order to obtain the desired three-dimensional effect discussed previously, a silicone material is added to the printing ink base in amounts of 5 – 20% by weight of the combination of the base and the silicone. Silicones which may be used in the printing ink include:

di-methylsiloxane,
polydi-methyl siloxane,
phenyl methyl polysiloxane.

A typical example of a di-methylsiloxane is the commercial product Dow 200 which has a viscosity of 60,000 centistokes at 25° C (ASTM D 445, Appendix C), a specific weight of 0.976 at 25° C (ASTM D 1298), a flash point of 321° F (ASTM D 92, open cup), an index of refraction of 1.4035 at 25° C (ASTM D 1218) and a surface tension at 25° C of 21.5 dynes/cm.

A representative example of a polydi-methyl siloxane is the commercial silicone fluid M 300,000 by Bayer which is a di-methyl polymer terminated in groups of trimethylsiloxane and having the formula:

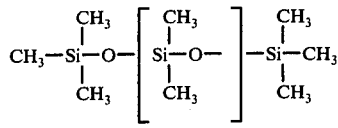

This product has a viscosity of 300,000 centistrokes ± 10%, a specific weight D 20/4° C of 0.96 - 0.97, a flash point above 350° C and a refraction index of 1.405.

An example of a phenyl methyl siloxane is Bayer's silicone fluid PL which has a viscosity of 210 ± 50 centipoises at 20° C in a Hopper ball viscometer, a specific weight D 20/4° C of 1.06 ± 0.02 and a surface tension of approximately 24 dynes/cm.

Top Coat

A composition suitable for use is:

|  | Range | Preferred Amount |
| --- | --- | --- |
| polyester, wax free | 58 – 64 % | 61.9 % |
| cobalt - 6% metal content | 0.7 – 0.8 % | 0.74 % |
| silicone solution | 1 – 10 % | 3.0 % |
| styrene monomer | 9 – 15 % | 11.3 % |
| diacetone alcohol | 2 – 4 % | 2.46 % |
| thixotropic | 18 – 23 % | 20.6 % |

The wax free polyester is a reaction product of maleic anhydride, phthalic anhydride, propylene glycol and trimethylolpropane diallyl ether. When the resin is combined with a styrene monomer in a 65/35 ratio, the mixture has a viscosity at 25° C of 500 - 1000 centipoises and an acid index of 35 (max.).

The thixotropic is formulated with a 98% content of the wax free polyester just described and a 2% content of a material commercially available as Degussa's Aerosil 200 (which has a silicium dioxide content of at least 99.8% and less than 0.05% alumina).

Binders other than the wax free polyester which may be used in the top coat formulation are alkyds, alkyd amines, acrylics, acrylic amines, epoxies, polyesters (non-saturated) with paraffin, vinyl lacquers, nitrocellulose lacquers, polyurethanes and oil free polyesters in combination with any of the foregoing materials.

Silicones which are suitable for the top coat are those which are referred to in the art as "anti-silicones", i.e., they have the property, when brought in contact with a silicone-containing surface of allowing adhesion with the latter surface. Consequently, when such "anti-silicones" are used in a top coat applied over a silicone-containing printing ink, substantially no surface disturbance occurs in the top coat material and the coatings adhere to one another with a smooth surface occurring over the printed areas.

Figure 3:
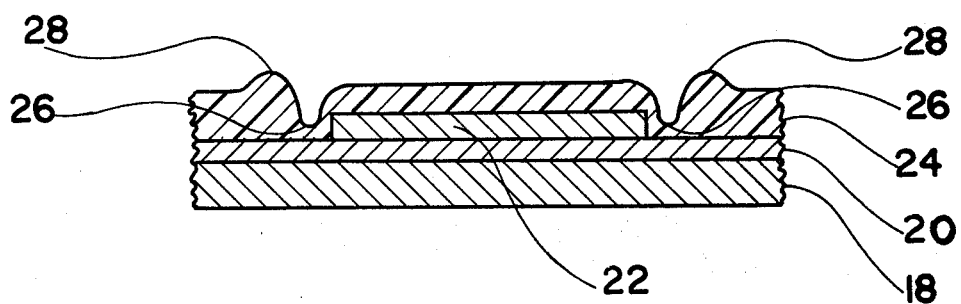
FIG. 3 is a sectional view of a pattern of the type shown in FIG. 1 but produced in accordance with the present invention.

The silicones used in the top coat also provide an additional advantage in improving the flow of the top coat in the unprinted areas of the panel beyond the depressions 26 and elevations 28 discussed with respect to FIG. 3.

Thus, the elimination of surface disturbances over the printed areas and the improved flow of the top coat over the unprinted areas result in a smooth, blemish free panel which has a three-dimensional effect adjacent the peripheries of the printed areas.

Preferably the silicone used in the top coat has a viscosity less than approximately 1,000 centistokes. Typical silicone materials which may be included in the top coat are commercially available silicone oils, designated A and OL, produced by Bayer.

Bayer Silicone Fluid A is a 100% polysiloxane having a specific weight D 20/4° C of 0.96 - 0.97, a viscosity at 20° C of 5 - 20 centipoises, a flash point of approximately 45° C and a surface tension of approximately 20 dynes/cm.

The Silicone Fluid OL by Bayer is an organofunctional silicone fluid having a specific weight D 20/4° C of 1.035 ± 0.01, a viscosity of 600 ± 100 centipoises at 20° C in a Hoppler ball viscometer, a flash point as per DIN 51 758 (Persky — Martins) of above 90° C, and a surface tension of approximately 23 dynes/cm.

Of course, in order to impart additional color effects to the product, pigments can be added to the top coat formulation in amounts up to approximately 10% by weight of the combination. The pigments may either be suspended in the top coat formulation or added thereto after being dissolved in an aniline.

So as to permit curing of the materials following the application of the top coat, a suitable catalyst is added with the top coat binder to the top coat formulation. A typical catalyst appropriate for such use is benzoyl peroxide in a quantity of approximately 2 - 4%.

The invention will be further illustrated but should not be limited by the examples to follow. In each case a hardboard substrate was provided with a base coat prepared according to the preferred formulation indicated above. Upon this base coat a pattern of printing ink was applied. The pattern included diverse configurations such as lines, dots and large surface areas. The base used for the printing ink was formulated in accordance with the preferred composition previously recited. A top coat was applied over the entire coated surface of the substrate. Deviations from the preferred top coat formulation included variations in the type of top coat binder utilized and in amounts of the silicone solution and the styrene monomer separately added to the top coat.

EXAMPLE 1

Silicone added to printing ink base:
    5% (Dow Corning 200)
Silicone solution included in top coat:
    3% (Bayer Silicone Fluid A)
Styrene monomer — 11.3%
Top coat binder — polyester, wax free

EXAMPLE 2

Silicone added to printing ink base:
    10% (Bayer Silicone Fluid M 300,000)
Silicone solution included in top coat:
    3% (Bayer Silicone Fluid A)

Styrene monomer — 11.3%
Top coat binder — polyester, wax free

EXAMPLE 3

Silicone added to printing ink base:
  20% (Bayer Silicone Fluid PL)
Silicone solution included in top coat:
  3% (Bayer Silicone Fluid OL)
Styrene monomer — 11.3%
Top coat binder — polyester, wax free

EXAMPLE 4

Silicone added to printing ink base:
  5% (50/50 mixture of Bayer Silicone Fluid PL and M 300,000)
Silicone solution included in top coat:
  3% (Bayer Silicone Fluid OL)
Styrene monomer — 11.3%
Top coat binder — polyester, wax free

EXAMPLE 5

Silicone added to printing ink base:
  6% (50/50 mixture of Bayer Silicone Fluid PL and Dow Corning 200)
Silicone solution included in top coat:
  2.5% (Bayer Silicone Fluid A)
Styrene monomer — 11.8%
Top coat binder — polyester, wax free

EXAMPLE 6

Silicone added to printing ink base:
  8% (50/50 mixture of Bayer Silicone Fluid M 300,000 and Dow Corning 200)
Silicone solution included in top coat:
  2.5% (Bayer Silicone Fluid A)
Styrene monomer — 11.8%
Top coat binder — polyester, wax free

EXAMPLE 7

Silicone added to printing ink base:
  20% (equal mixture of Bayer Silicone Fluids PL and M 300,000 and Dow Corning 200)
Silicone solution included in top coat:
  2.5% (Bayer Silicone Fluid OL)
Styrene monomer — 11.8%
Top coat binder — polyester, wax free

EXAMPLE 8

Silicone added to printing ink base:
  5% (Dow Corning 200)
Silicone Solution included in top coat:
  1% (Bayer Silicone Fluid A)
Styrene monomer — 13.3%
Top coat binder — alkyd melamine

EXAMPLE 9

Silicone added to printing ink base:
  5% (Dow Corning 200)
Silicone solution included in top coat:
  10% (Bayer Silicone Fluid OL)
Styrene monomer — 4.3%
Top coat binder — polyester, wax free

EXAMPLES 10 - 12

Silicone added to printing ink base:
  Ex. 10 — 8% (Dow Corning 200)
  Ex. 11 — 12% (Dow Corning 200)
  Ex. 12 — 18% (Dow Corning 200)
Silicone solution included in top coat:
  2.5% (Bayer Silicone Fluid OL)
Styrene monomer: 11.8%
Top coat binder: polyester, wax free

EXAMPLES 13 - 15

Silicone added to printing ink base:
  Ex. 13 — 8% (Dow Corning 200)
  Ex. 14 — 12% (Dow Corning 200)
  Ex. 15 — 18% (Dow Corning 200)
Silicone solution included in top coat:
  3.5% (Bayer Silicone Fluid OL)
Styrene monomer — 10.8%
Top coat binder: polyester, wax free

EXAMPLES 16 - 18

Silicone added to printing ink base:
  Ex. 16 — 8% (Dow Corning 200)
  Ex. 17 — 12% (Dow Corning 200)
  Ex. 18 — 18% (Dow Corning 200)
Silicone solution included in top coat:
  5.0% (Bayer Silicone Fluid OL)
Styrene monomer — 9.3%
Top coat binder: polyester, wax free In each of the foregoing examples a product was achieved which had a solid, uninterrupted, smooth-surfaced top coat over the printed areas. This resulted from the combined effect of the silicones of the printing ink and the top coat. Instead of breaking into "islands" or a series of "fisheyes" or cells, the total amount of silicone at the interface of the top coat and the ink over the pattern (contributed to primarily by the printing ink composition) was sufficiently large to prevent a surface disturbance of the top coat.

However, since the repulsion forces of the silicones used in the top coat are less than those of the printing ink silicone, the forces of the latter directed away from the printed patterns were able to overcome opposing forces of the top coat silicone so as to produce the depressions 26 and elevations 28 of FIG. 3 immediately adjacent the printed areas. The reaction forces of the top coat silicone were sufficient nevertheless to limit the extent of displacement of the top coat thereby preventing a large buildup of top coat material and sharply defining the depressions 26 and elevations 28 to avoid irregularities of the type designated at 17 in FIG. 1.

The silicone content of the top coat also prevented those remaining portions of the top coat over unprinted areas from curing with an irregular surface shown in FIG. 2. This was due to the flow characteristic supplied by this silicone. Consequently, except for the depressions 26 and elevations 28, the surfaces of the top coat were smooth and substantially level with respect to one another throughout the product.

What is claimed is:

1. In a decorative panel comprising a pigmented base coated substrate, a silicone containing printing ink forming a pattern on a portion of said substrate and a top coat material covering said pattern and the remaining portion of said substrate, the improvement comprising said printing ink containing at least 5 weight percent silicone, said top coat material containing an effective amount of silicone, and said silicone in said printing ink and said silicone in said top coat material being such as to produce a depression at the printing ink-top coat interface adjacent the periphery of the pattern formed from said printing ink and an elevation immediately outwardly of the said depression so as to produce a three-dimensional effect, with the level of the top coat material over the remainder of said pattern being substantially the same level as the remainder of said panel wherein the remainder of said pattern and the remainder of said panel are smooth and essentially free of separate islands of said top coat material.

2. The decorative panel of claim 1 wherein silicone is present in said printing ink in an amount of 5–20 percent by weight thereof.

3. The decorative panel of claim 1 wherein silicone is present in said top coat material in an amount of 0.05–0.5 percent by weight thereof.

4. The decorative panel of claim 1 wherein said pattern covers a substantial area of said pigmented base coated substrate.

* * * * *